United States Patent
Hirano et al.

(10) Patent No.: US 6,481,458 B2
(45) Date of Patent: Nov. 19, 2002

(54) RELIEF VALVE ASSEMBLY

(75) Inventors: Kouji Hirano, Wako (JP); Masakazu Kinosita, Wako (JP); Hisayuki Hashimoto, Wako (JP); Yasunori Ono, Kiryu (JP); Yoshiaki Senga, Kiryu (JP)

(73) Assignees: Honda Giken Kogyo Kabushiki Kaisha, Tokyo (JP); Kabushiki Kaisha Yamada Seisakush, Gunma-ken (JP)

( * ) Notice: Subject to any disclaimer, the term of this patent is extended or adjusted under 35 U.S.C. 154(b) by 0 days.

(21) Appl. No.: 09/794,164

(22) Filed: Feb. 28, 2001

(65) Prior Publication Data

US 2001/0027811 A1 Oct. 11, 2001

(30) Foreign Application Priority Data

Mar. 3, 2000 (JP) ........................ 2000-059468
Feb. 16, 2001 (JP) ........................ 2001-040874

(51) Int. Cl.⁷ .................... F16K 15/02; F04B 49/24
(52) U.S. Cl. .................. 137/538; 137/540; 417/310
(58) Field of Search ............... 137/538, 494, 137/540; 417/307, 310, 311

(56) References Cited

U.S. PATENT DOCUMENTS

| | | | | |
|---|---|---|---|---|
| 764,642 A | * | 7/1904 | Stenwall ................. 137/538 |
| 1,128,077 A | * | 2/1915 | Taylor .................... 137/538 |
| 1,356,298 A | * | 10/1920 | McGregor .............. 137/540 X |
| 1,844,668 A | * | 2/1932 | McGregor ............... 137/538 |
| 2,011,333 A | * | 8/1935 | Clifton ................... 137/53 |
| 2,287,840 A | * | 6/1942 | Stratton .................. 137/538 |
| 2,305,519 A | * | 12/1942 | Dunmire ................. 137/538 |
| 2,375,077 A | * | 5/1945 | Caserta .................. 417/310 X |
| 2,679,858 A | * | 6/1954 | Kemp .................... 137/382 |
| 3,092,133 A | * | 6/1963 | Clark .................... 137/220 |
| 3,270,675 A | * | 9/1966 | Ajam .................... 417/310 X |
| 3,373,689 A | * | 3/1968 | Brunson ................. 417/310 |
| 3,490,593 A | * | 1/1970 | Pohoski .................. 210/130 |
| 3,720,208 A | * | 3/1973 | Aldrich et al. .......... 128/201.27 |
| 4,161,189 A | * | 7/1979 | Mueller, Jr. ............. 137/514.7 |
| 4,256,137 A | * | 3/1981 | Launay ................... 137/496 |
| 4,739,612 A | * | 4/1988 | Stockbridge ............ 60/39.091 |
| 4,883,083 A | * | 11/1989 | Fisher et al. ............ 137/110 |
| 5,054,518 A | * | 10/1991 | Rancani ................. 137/516.27 |
| 5,069,111 A | * | 12/1991 | Loffler et al. ............ 91/516 |
| 5,195,494 A | * | 3/1993 | Tuckey ................... 123/514 |
| 5,395,518 A | * | 3/1995 | Gulsvig .................. 210/132 |
| 5,921,274 A | * | 7/1999 | Schuller et al. ......... 417/310 X |
| 6,224,754 B1 | * | 5/2001 | Schiavon et al. ........ 210/130 |
| 6,352,085 B1 | * | 3/2002 | Morita et al. ........... 417/310 X |

FOREIGN PATENT DOCUMENTS

JP 5-94220 4/1993

* cited by examiner

*Primary Examiner*—John Rivell
(74) *Attorney, Agent, or Firm*—Lowe Hauptman Gilman & Berner, LLP

(57) ABSTRACT

A relief valve assembly, comprises: a relief valve; a valve housing including a valve path along which the relief valve can slide; a relief inflow portion formed on one end of the valve housing; and relief discharge portions formed at an intermediate location of the valve path of the valve housing and provided with small aperture portions axed large aperture portions formed in communication with one another. A side wherein the relief discharge portions are provided with the small aperture portions is the side near the relief inflow portion.

17 Claims, 11 Drawing Sheets

RELIEF VALVE ASSEMBLY

BACKGROUND OF THE INVENTION

1. Field of the Invention

The present invention relates to a relief valve assembly, that can prevent abrupt pressure drops during relief operations in an oil pump, and thus can perform superior relief operations.

2. Description of the Related Art

When operating vehicle engines at high rotation speeds, engine lubricating oil is supplied by an oil pump. Most oil pumps are equipped with relief valves for pressure control. When the supplied oil in the oil pump is under abnormally high pressure, the relief valve assembly diverts the oil to a different route to hold the oil pressure constant, so as to avoid damage of the machinery.

However, if the high pressure is decreased at once with such a relief operation, the supplied amount of oil is not constant, and pulsations or bubbles occur, and as a result, oscillations occur, which may have a harmful effect on the machinery to which the oil is supplied, Therefore, attempts have been made to increase the initial amount of the return oil from the relief valve little by little, in order to avoid abrupt pressure drops in the relief valve assembly.

A specific example of such a relief valve assembly is disclosed in JP H5-94220A, which is provided with a relief valve for pressure control. In this relief valve assembly, one end is closed, and at the other end an oblong first adjustment hole 76 and second adjustment hole 78 are formed in communication with one another along the axial direction of the relief valve at a lateral position in a relief valve unit of perforated cylindrical shape having a bottom.

In JP H5-94220A, a pressurized fluid, such as oil, flows into the relief valve unit of cylindrical shape having a bottom, and when, depending on the pressure acting on the bottom portion, the relief valve unit moves against the spring force of a holding spring, then abrupt pressure drops do not occur when the pressurized fluid, such as oil is discharged, because the pressure adjustment hole provided near the bottom portion of the relief valve is formed such that its aperture area changes in accordance with the movement of the relief valve.

The pressurized fluid, such as oil, that has entered the relief valve unit of cylindrical shape having a bottom is first discharged through the aperture opening in the oblong first adjustment hole 76 of the pressure adjustment holes in the relief valve unit. However, the aperture area is increased little by little due to the surface area change of the pressure adjustment holes, namely the oblong first adjustment hole 76 provided with a rectangular cross section and the circular second adjustment hole 78 whose aperture area is larger, and an aperture to the pressure side chamber of the relief valve unit develops abruptly from the rectangular cross section of the aperture of the first adjustment hole 76 with the smaller aperture area, and it is very difficult to attain more stable and improved start-up properties, Furthermore, if no pressurized fluid, such as oil, is given into the relief valve unit of cylindrical shape having a bottom, then the structure is such that it is not possible to form an aperture with the pressure adjustment hole of the relief valve unit, so that when there is foreign matter in the pressurized fluid, such as oil, the foreign matter tends to accumulate at the bottom portion and at the pressure adjustment hole near the bottom portion of the relief valve unit, and there is the danger that foreign matter enters between the sliding faces of the relief valve unit and the valve housing, thus hindering or blocking the sliding of the relief valve unit.

Due to protruding of the valve from the valve path into the valve housing when the relief valve unit slides, the sliding support portion of the valve unit is gradually reduced, so that there is the danger that the movement of the relief valve unit becomes unstable. This can result in a gradual tilting when the valve unit moves.

Therefore, every time the valve unit moves along the valve path during the relief operations the edge of the valve unit erodes the surface of the valve path, causing damage, so that the reaction of the valve unit to abnormal pressures may deteriorate. Also, the machining of the first adjustment hole 76 and the second adjustment hole 78 in the lateral circumferential wall of the valve unit is not easy, and it is difficult to reduce costs,

SUMMARY OF THE INVENTION

As a result of many of hours of thorough research trying to solve these problems, the inventors have succeeded in developing a relief valve assembly with a very simple structure, with which a relief operation with superior reaction is realized, thus solving the above-mentioned problems. This relief valve assembly comprises a relief valve, a valve housing including a valve path along which the relief valve can slide, a relief inflow portion formed on one end of the valve housing, and relief discharge portions formed at a substantially intermediate location of the valve path of the valve housing and provided with small aperture portions and large aperture portions formed in communication with one another, wherein a side where the relief discharge portion is provided with the small aperture portions is the side near the relief inflow portions

BRIEF DESCRIPTION OF THE DRAWINGS

FIG. 13A is a magnified perspective view, taken in cross-section at the relief discharge portion, in a third embodiment of the present invention.

DESCRIPTION OF THE PREFERRED EMBODIMENTS

Figure 1:
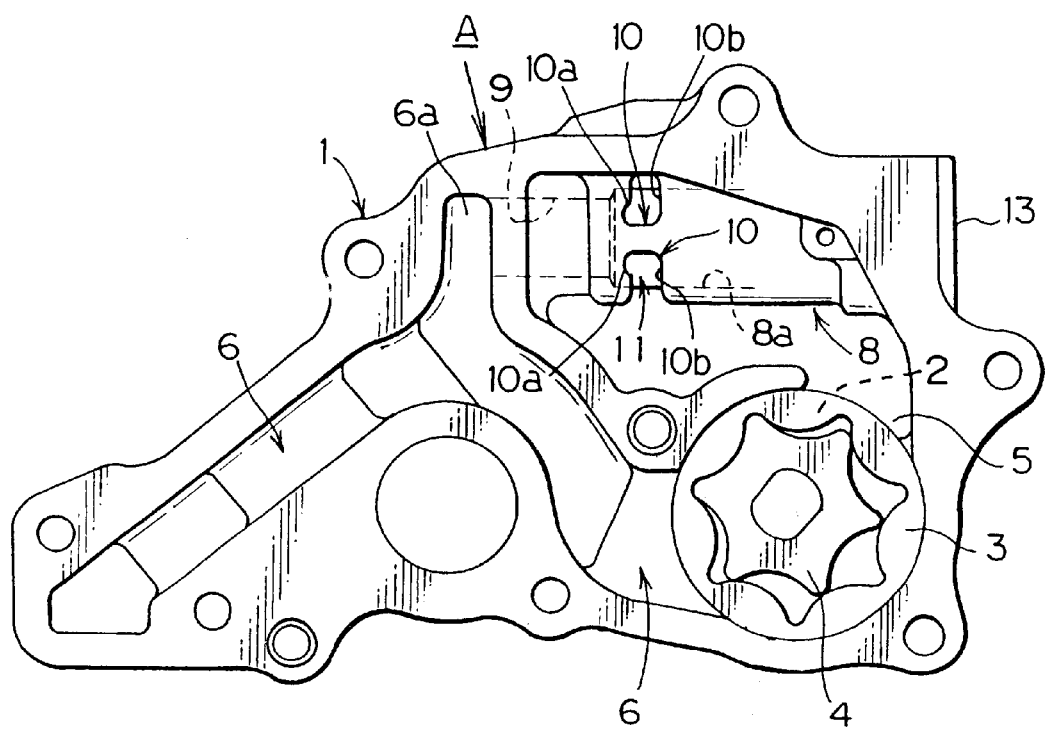
FIG. 1 is a plan view of an oil pump casing provided with the present invention.

The following is a description of the preferred embodiments of the present invention, with reference to the accompanying drawings. In the first embodiment, a casing A that can be taken apart includes a pump body 1 and a pump cover. A rotor chamber 2 is formed inside the casing A. More specifically, a recess is formed in the pump body 1, and when the pump cover has been attached to the pump body 1, this recess forms a flat cylindrical hollow rotor chamber 2. Mounted eccentrically inside the rotor chamber 2 are an outer rotor 3 provided with internal teeth and an inner rotor 4 provided with outer teeth, meshing with one another (see FIG. 1).

More specifically, the teeth of the outer rotor 3 and the inner rotor 4 form toroidal lines. The inner rotor 4 has one tooth less than the outer rotor 3, so when the inner rotor 4 completes one rotation, the outer rotor lags by a portion corresponding to one tooth.

At all rotation angles, the cusps of the inner rotor 4 always contact the cusps or bottoms of the outer rotor 3, and a plurality of cavities are formed between the outer rotor 3 and adjacent cusps of the inner rotor 4. In the course of one rotation, these cavities become bigger and smaller, and oil is sucked in from the inlet port 5 and discharged through the outlet port 6, and circulated back into the machine.

The relief valve assembly includes a valve housing 8 and a relief valve 11 (see FIG. 2 to FIG. 6). A valve path 8a is formed in the valve housing 8, and the relief valve 11 slides inside the valve path 8a. The valve housing 8 is formed, in one piece with a relief inflow portion 9, and the two are in communication with one another. More specifically, the valve housing 8 is bulged so as to form a substantially half-cylinder shape at a predetermined position inside the casing A (see FIG. 6).

A branching path 6a is formed in the outlet port 6, and the branching path 6a is connected to the relief inflow portion 9 (see FIG. 1). In case of abnormally high pressures in the outlet port 6, the fluid is fed from the branching path 6a over the relief inflow portion 9 into the valve housing 8.

The inner diameter of the relief inlet inflow portion 9 is different from the inner diameter of the valve path 8a. The step due to the diameter difference between the valve path 8a and the relief inflow portion 9 serves as the relief inflow closing surface 8c on the side of the relief inflow portion 9 of the relief valve 11 in the valve path 8a.

Relief discharge portions 10 are formed at an approximately intermediate position of the valve path 8a. Here, "approximately intermediate position of the valve path 8a" includes everything but the two ends in path direction. Actually, the position of the relief discharge portions 10 in the direction of the valve path 8a is close to the relief inflow port 9 (see FIG. 2 to FIG. 4). The relief discharge portions 10 include small aperture portions 10a and large aperture portions 10b, and the small aperture portions 10a are closer to the relief inflow portion 9 than the large aperture portions 10b.

Figure 2:
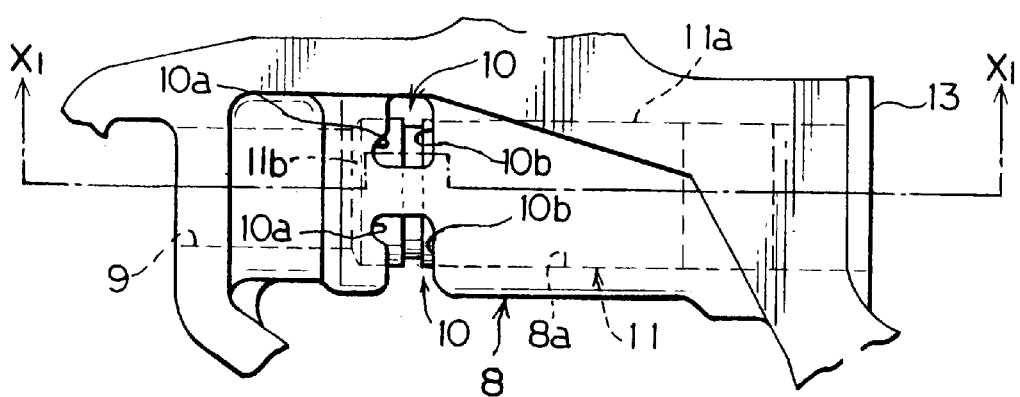
FIG. 2 is a plan view of the relief valve assembly in accordance with a first embodiment of the present invention.
Figure 3:
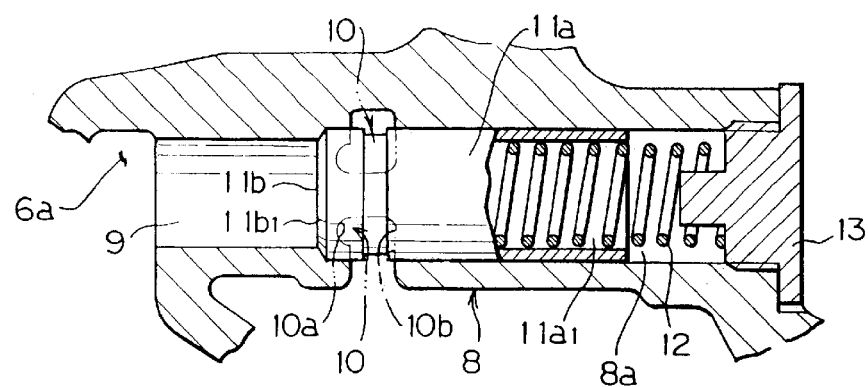
FIG. 3 is a longitudinal cross-sectional plan view of the relief valve assembly in accordance with the first embodiment of the present invention.
Figure 4:
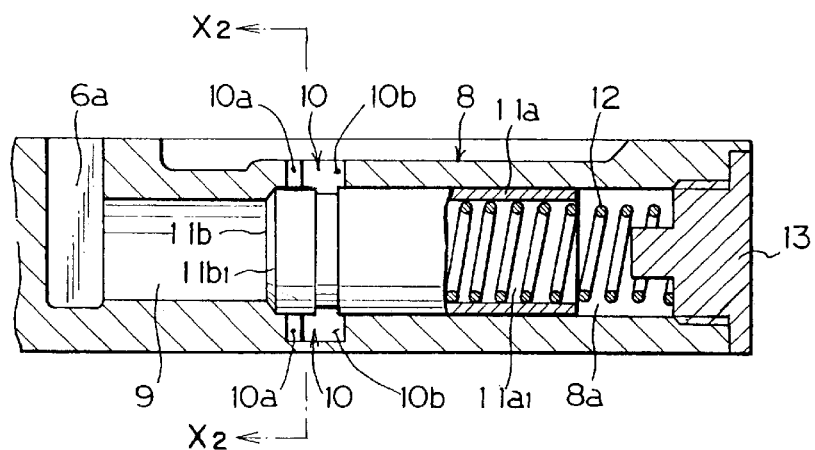
FIG. 4 is a cross-sectional drawing, taken in arrow direction along $X_1$—$X_1$ in FIG. 2.
Figure 5A:
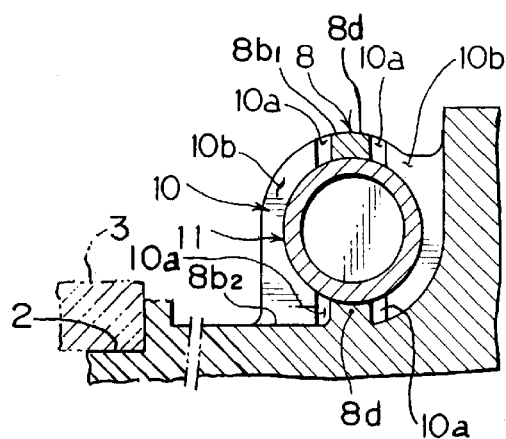
FIG. 5A is a cross-sectional drawing, taken in arrow direction along $X_2$—$X_2$ in FIG. 4.
Figure 7:
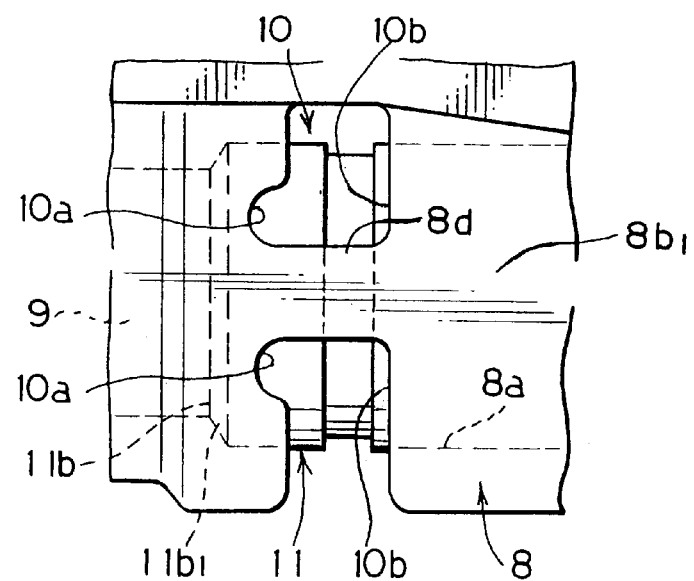
FIG. 7 is a magnified plan view showing the relief discharge portion at the top portion of the valve housing.

The two relief discharge portions 10 are arranged at a suitable spacing in a direction perpendicular to the axial direction of the valve housing 8 (that is in the width direction) and approximately left-right symmetrically to one another, (see FIG. 2, FIG. 5A and FIG. B and FIG. 7A and FIG. B). Between the two relief discharge portions 10, there are remaining wall portions 8d of the valve path 8a, which are connected to a portion of the valve path 8a, and serve as guiding and holding portions at the relief discharge portions 10 when the relief valve 11 is moved. The rigidity of the valve housing 8 at the relief discharge portions 10 can be ensured by forming the small aperture portions 10a along the remaining wall portions 8d, which is preferable.

Figure 10A:
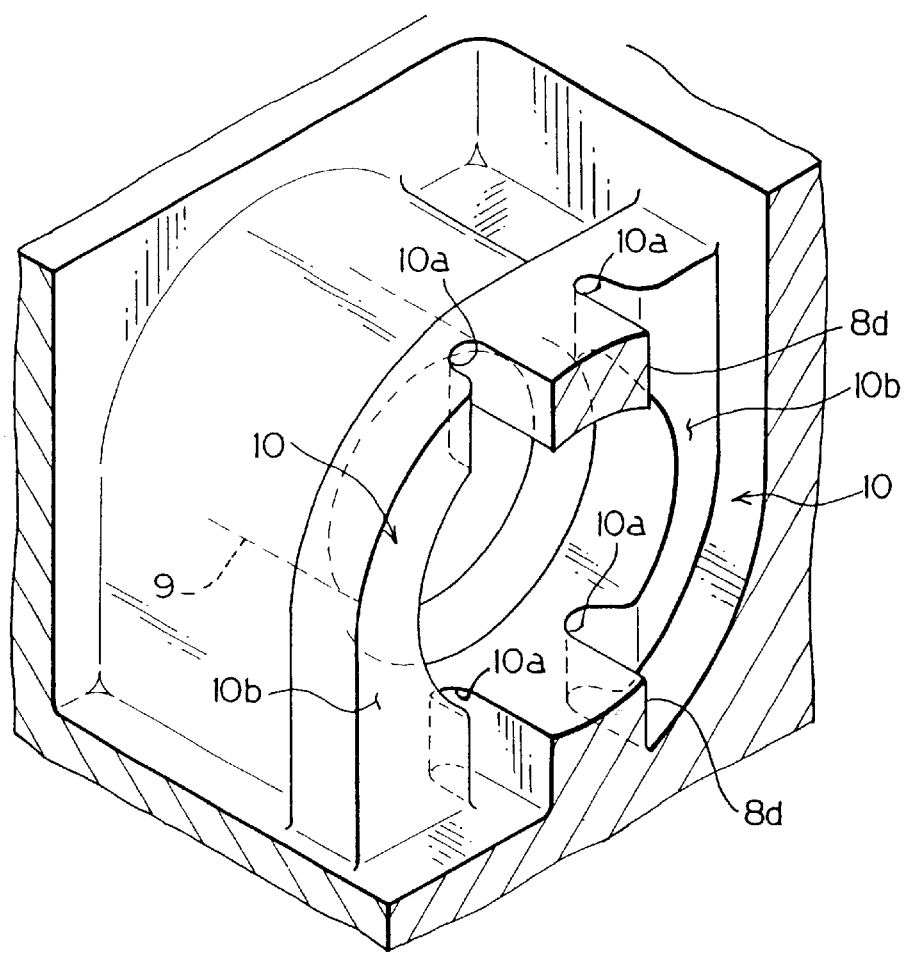
FIG. 10A is a magnified perspective view of the valve housing, taken in cross-section at the relief discharge portion, in the first embodiment of the present invention.
Figure 10B:
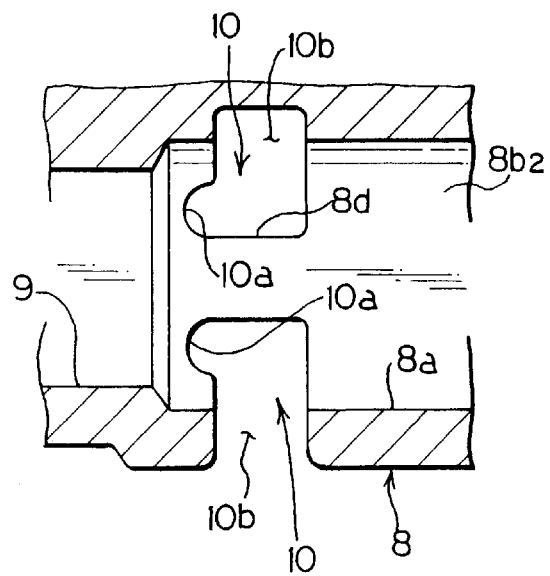
FIG. 10B is a magnified plan view of the relief discharge portion at the bottom portion of the valve housing.

The large aperture portions 10b of the relief valve discharge portions 10 are formed as substantially rectangular apertures. Moreover, the small aperture portions 10a are smaller than the large aperture portions 10b (see FIG. 2 and FIG. 7). The large aperture portions 10b are formed in locations at both sides in the width direction of the valve housing 8, from a top portion 8b₁ of the valve housing 8 toward a bottom portion 8b₂. The remaining wall portions 8d are formed both on the side of the top portion 8b₁ of the valve housing 8 and on the side of the bottom portion 8b₂ (see FIG. 5A and FIG. B and FIG. 10A for example). More specifically, the small aperture portions 10a are formed at the top portion 8b, and at the bottom portion 8b₂ of the valve housing 8 at the large aperture portions 10b, and are formed as small cut-outs protruding toward the relief inflow portion 9 (see FIG. 7 and FIG. 10B). Because the small aperture portions 10a are formed at the top portion 8b₁ and at the bottom portion 8b₂ in the valve housing 8 at the two large aperture portions 10b, the small aperture portions 10a are formed at a total of four locations (see FIG. 5A and FIG. 10 for example). That is to say, small aperture portions 10a are placed to the left and right symmetrically on both sides of the remaining wall portions 8d formed at the top portion 8b, and at the bottom portion 8b₂. Furthermore, as will be explained below, in the second embodiment of the present invention, it is also possible to form the small aperture portions 10a only at the upper portion of the two large aperture portions 10b. In this second embodiment, the small aperture portions 10a are formed only on both sides of the upper remaining wall portion 8d, so that there are only two small aperture portions 10a.

Figure 16:
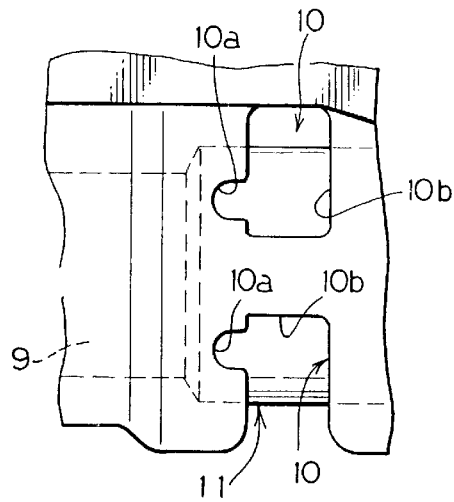
FIG. 16 is a magnification of another example of the relief discharge portion.

A variety of shapes are possible for the small aperture portions 10a, and to be specific, the indented small aperture portions 10a can be of substantially semicircular or semi-elliptical shape. The indented small aperture portions 10a are not limited to circular shapes, and can also be arc-shaped. Moreover, the shape of the small aperture portions 10a can reach to one of the corners of the rectangular large aperture portions 10b, but there are also examples, in which they are formed at locations away from these corners (see FIG. 16).

In another example of the relief discharge portions 10, the small aperture portions 10a and the large aperture portions 10b are formed so as to successively widen up substantially continuously from the side of the relief inflow portion 9. As an example thereof, the small aperture portions 10a and the large aperture portions 10b are triangular with arc-shaped sides that are substantially in one piece.

Figure 17:
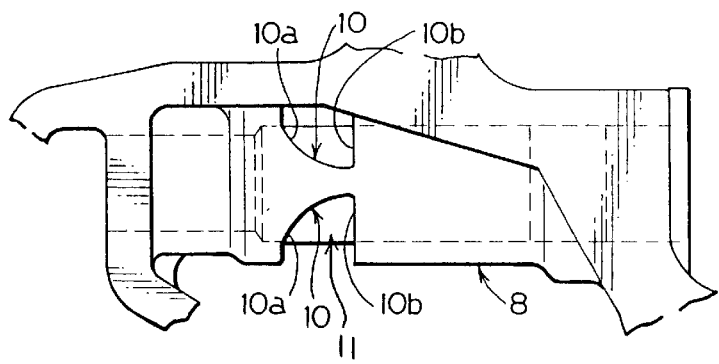
FIG. 17 is a plan view of yet another example of the relief discharge portion.

More specifically, the oblique side of the small aperture portions 10a and the oblique side of the large aperture portions 10b are formed to coincide with substantially equal arcs (FIG. 17). This example is an attempt to reduce the change of the shape from the small aperture portions 10a to the large aperture portions 10b in the relief discharge portions 10. Consequently, the discharge of the hydraulic fluid from the relief discharge portions 10 during relief is carried out smoothly.

The following is an explanation of the configuration of the relief valve 11 with reference to FIG. 8. An oblique surface 11b₁ is formed circumferentially around a valve head 11b of a hollow cylindrical portion 11a of the relief valve 11. The valve head 11b and the oblique surface 11b₁ are provided with substantially cut-off conical shape. Moreover, a spring 12 is inserted into the hollow portion 11a₁ of the hollow cylindrical portion 11.

The relief valve 11 is mounted slidably in axial direction in the valve path 8a of the valve housing 8. The spring 12 is mounted in the hollow portion 11a₁ of the relief valve 11 mounted in the valve path 8a. Supporting the other side of the spring 12, a check member 13 is accommodated and fixed in the valve path 8a.

The relief valve 11 accommodated in the valve housing 8 is always elastically biased by the spring 12 toward the relief inflow portion 9 of the valve path 8a, and the valve head 11b of the relief valve 11 abuts against the relief inflow closing surface 8c of the valve path 8a. More specifically, the oblique surface 11b₁ of the valve head 11b abuts against the relief inflow closing surface 8c. Thus, it is in a state in which relief is not carried out. By forming an oblique surface 11b₁ circumferentially around the valve head 11b of the relief valve 11, foreign matter contaminating the oil can be pushed out immediately by the oblique surface 11b₁ through the relief discharge portions 10.

When an abnormal pressure occurs in the oil that is discharged through the outlet port 6, the oil flows due to this abnormal pressure through the branching path 6a of the outlet port 6 into the relief inflow portion 9, and presses against the valve head 11b of the relief valve 11. This abnormal pressure overcomes the spring force of the spring 12, so that the relief valve 11 is pushed into the valve path 8a.

In this situation, first, when the position of the valve head 11b reaches the small aperture portions 10a of the relief discharge portion 10, oil is relieved through these small aperture portions 10a, and a small relief amount is afforded by these small aperture portions 10a. When the relief valve 11 is pushed further by abnormal pressure, the relief valve 11 moves further, and when the valve head 11b reaches the large aperture portions 10b, the oil relief amount increases. Thus, the amount of the oil to be relieved increases as it flows off through the small aperture portions 10a and the large aperture portions 10b.

Figure 5B:
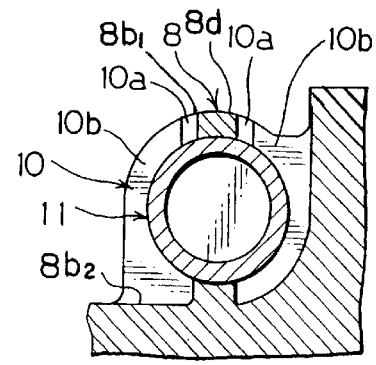
FIG. 5B is a cross-sectional view, taken from the same direction as FIG. 5A, of a second embodiment of the present invention, in which the small aperture portions are provided only at the top portion in the valve housing.
Figure 6:
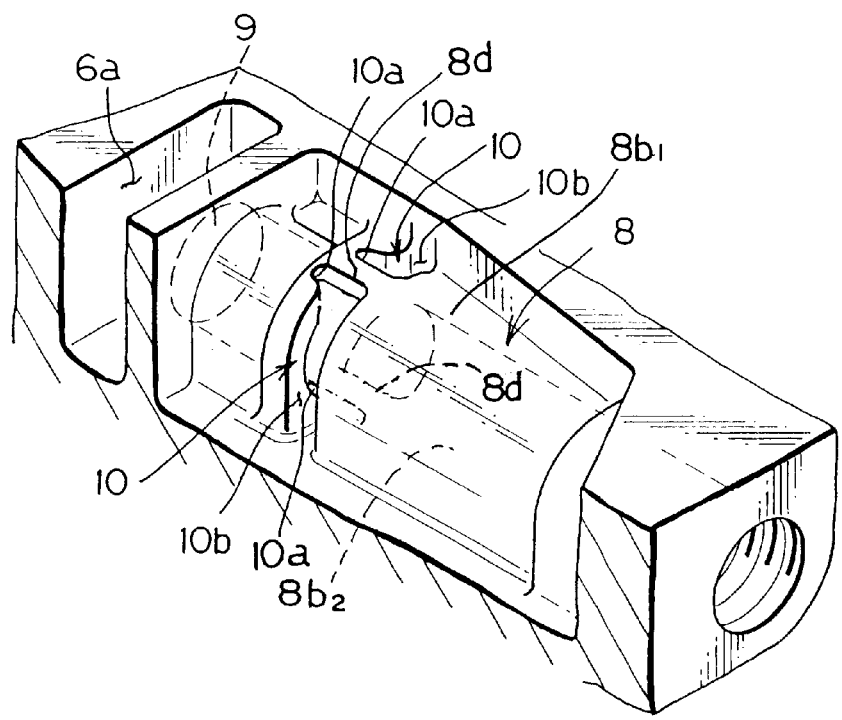
FIG. 6 is a perspective view of the relief valve assembly.

FIG. 12 and FIG. 5B illustrate a second embodiment of the present invention, in which the small aperture portions 10a are formed only at the top portion 8b₁ of the large aperture portions 10b in the valve housing 8. In this embodiment, there are no small aperture portions 10a in the bottom portion 8b₂ but only large aperture portions 10b (see FIG. 12B). FIG. 12C and FIG. 12D show how the pressurized fluid acts in this embodiment, and show how the pressurized fluid is gradually discharged from the small aperture portions 10a formed on the side of the top portion 8b₁.

Figure 12A:
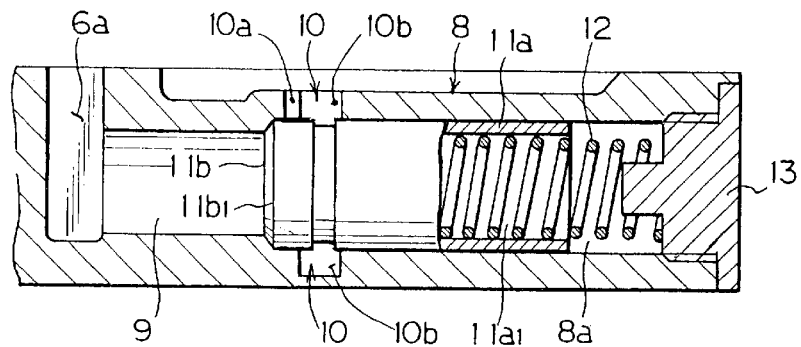
FIG. 12A is a longitudinal cross-sectional lateral view of the valve housing in a second embodiment of the present invention, in which only the large aperture portions at the top portion are provided with small aperture portions.
Figure 12B:
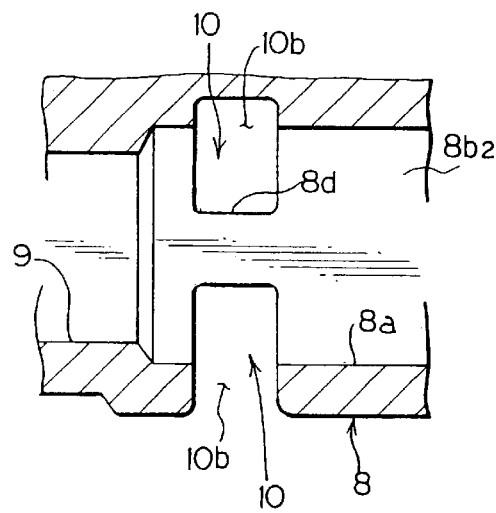
FIG. 12B is a magnified plan view of the relief discharge portion at the bottom portion of the valve housing.
Figure 12C:
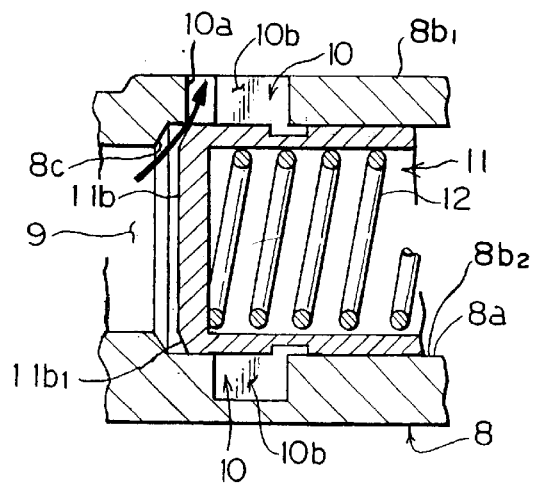
FIG. 12C is a longitudinal cross-sectional lateral view illustrating how the discharge of the pressurized fluid through the small discharge portions begins.
Figure 12D:
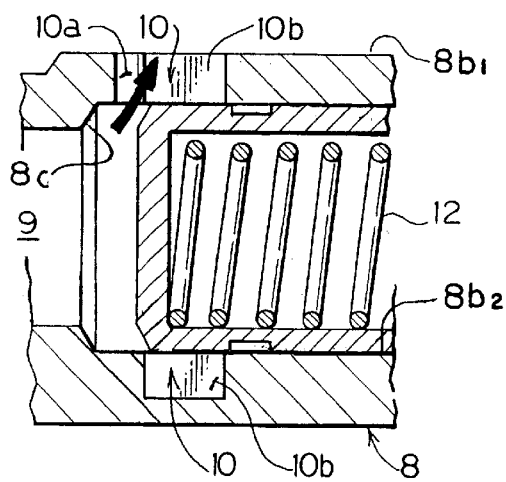
FIG. 12D is a longitudinal cross-sectional lateral view illustrating how the discharge of the pressurized fluid has reached the large discharge portions.
Figure 13B:
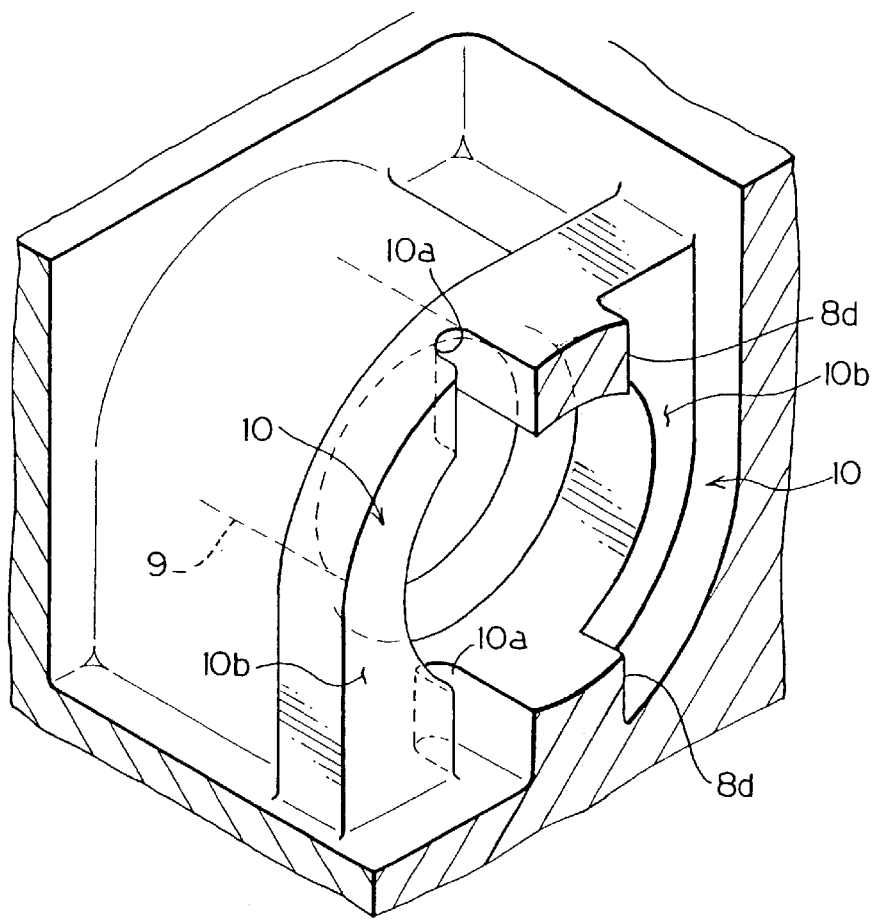
FIG. 13B is a longitudinal cross-sectional view showing the relief discharge portion of the valve housing.
Figure 13B:
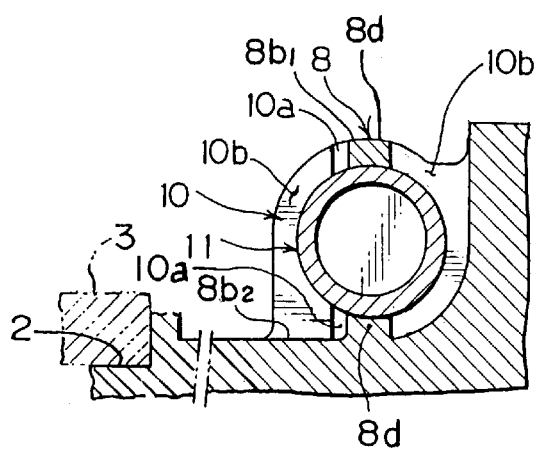
Figure 13C:
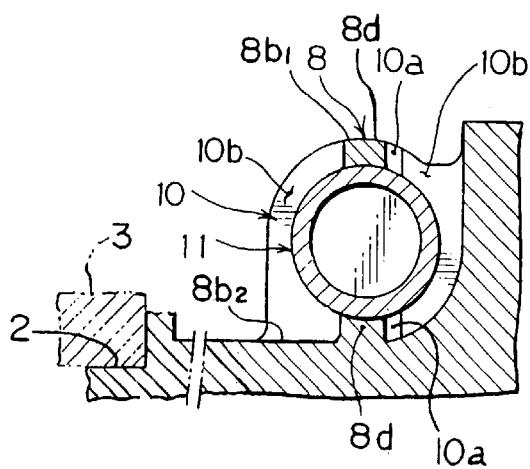
FIG. 13C is a longitudinal cross-sectional view showing the relief discharge portion of the valve housing in a different type of the third embodiment.

FIGS. 13A, 12B and 12C illustrate a third embodiment of the present invention, in which small aperture portions 10a are formed at the top portion 8b₁ and the bottom portion 8b₂ at only one side of the relief discharge portions 10 formed on both sides in the width direction in the valve housing 8. More specifically, the small aperture portions 10a are formed only on one side of the remaining wall portions 8d at the top portion 8b₁ and the bottom portion 8b2 of the housing 8. FIG. 13A and FIG. 12B show an embodiment in which the small aperture portions 10a are formed on the side of the rotary chamber 2, seen from the valve housing 8. FIG. 13C shows an embodiment in which the small aperture portions 10a are formed on the side of the inner wall of the casing A, seen from the valve housing 8.

Figure 14A:
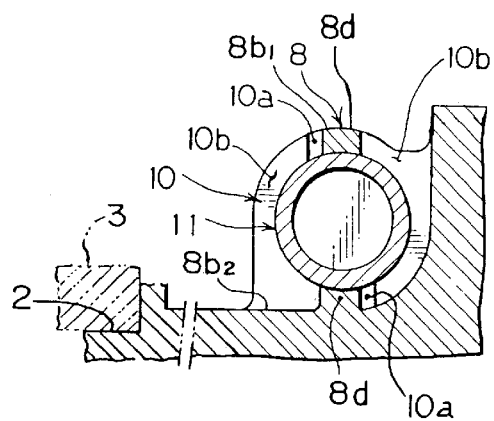
FIG. 14A is a longitudinal cross-sectional view showing the relief discharge portion of the valve housing in a fourth embodiment of the present invention.
Figure 14B:
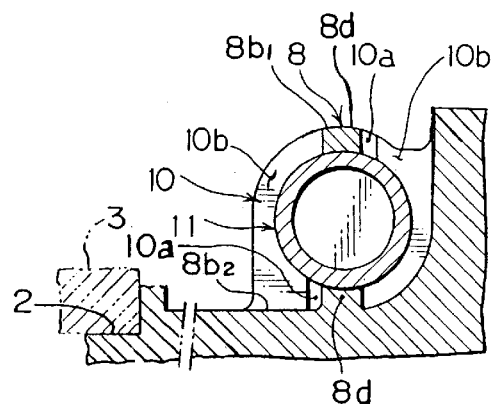
FIG. 14B is a longitudinal cross-sectional view showing the relief discharge portion of the valve housing in a different type of the fourth embodiment.

FIG. 14A and FIG. 14B illustrate a fourth embodiment of the present invention, in which one small aperture portion 10a each is formed at the relief discharge portions 10 formed on either side in the width direction of the valve housing 8. The two small aperture portions 10a are formed at different positions in the vertical direction (that is, in the direction from the bottom portion 8b₂ to the top portion 8b₁). More specifically, at the large aperture portion 10b on one side of the two relief discharge portions 10, a small aperture portion 10a is formed on the side of the top portion 8b₁, and at the large aperture portion 10b on the other side, a small aperture portion 10a is formed on the side of the bottom portion 8b₂.

FIG. 14A shows an embodiment, in which, seen from the valve housing 8, a small aperture portion 10a is formed at the large aperture portion 10b in the top portion 8b$_1$ on the side of the rotor chamber 2, and another small aperture portion 10a is formed in the bottom portion 8b$_2$ of the large aperture portion 10b on the other side. FIG. 14B shows an embodiment, in which, seen from the valve housing 8, a small aperture portion 10a is formed at the large aperture portion 10b in the bottom portion 8b$_2$ on the side of the rotor chamber 2, and another small aperture portion 10a is formed in the top portion 8b$_1$ of the large aperture portion 10b on the other side.

Figure 15A:
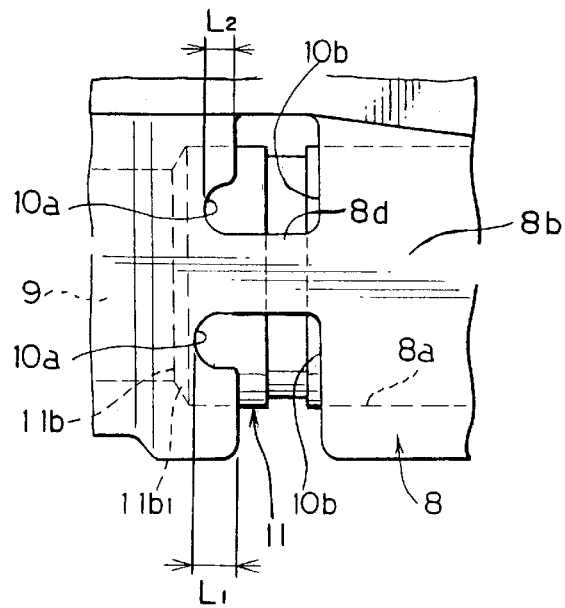
FIG. 15A is a top view showing the relief discharge portion of the valve housing in a fifth embodiment of the present invention.
Figure 15B:
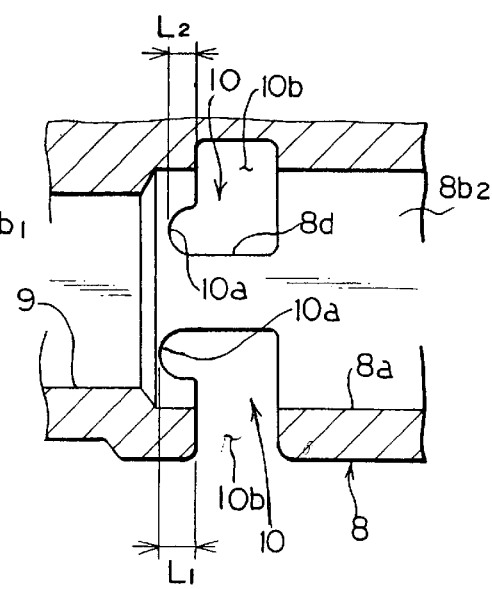
FIG. 15B is a bottom view showing the relief discharge portion of the valve housing in the fifth embodiment of the present invention.

In a fifth embodiment of the present invention, the plurality of small aperture portions 10a have notches of different sizes. More specifically, when L$_1$ is the size of the notch of the small aperture portion 10a on one side of the two relief discharge portions 10 formed in the valve housing 8, and L$_2$ is the size of the notch of the small aperture portion 10a on the other side, then (notch size L$_1$)>(notch size L$_2$). FIG. 15A shows an embodiment, in which different small aperture portions 10a are formed in the top portion 8b$_1$ of the housing 8, and FIG. 15B shows an embodiment, in which different small aperture portions 10a are formed in the bottom portion 8b$_2$ of the housing 8. In addition to FIG. 5A, the fifth embodiment can also be applied to the arrangements of the small aperture portions 10a of FIG. 5B, FIG. 13 or FIG. 14. In this manner, it is possible to generate a suitable time lag in the times at which the pressurized fluid starts to be discharged from the small aperture portions 10a, and it is possible to achieve an even smoother pressure change.

Figure 8A:
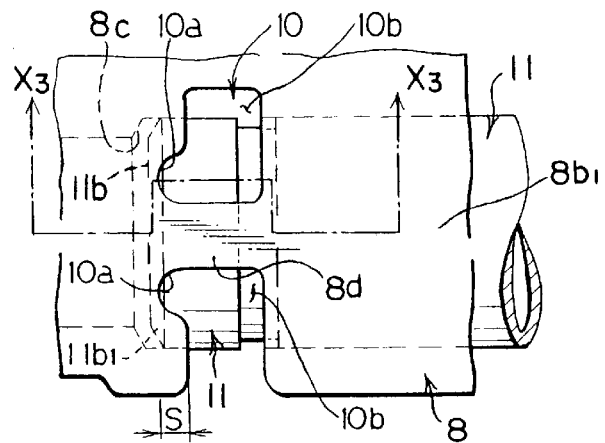
FIG. 8A is a magnified plan view of the discharge operation at the small aperture portions.
Figure 8B:
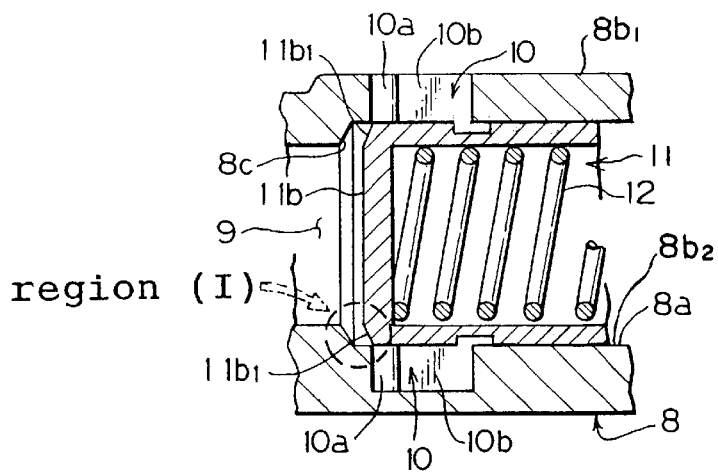
FIG. 8B is a cross-sectional view taken in arrow direction along $X_3$—$X_3$ in FIG. 8A.
Figure 8C:
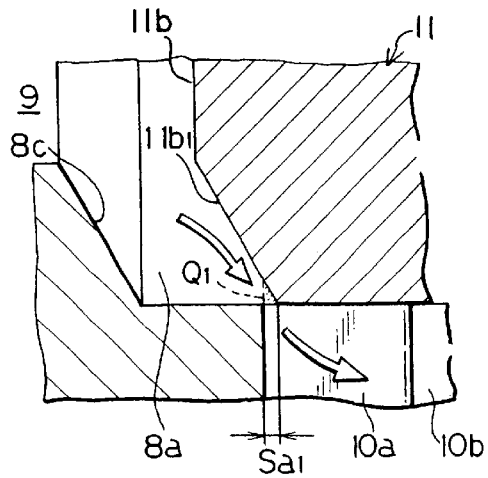
FIG. 8C is a magnified view illustrating the discharge at the region (I) in FIG. 8B.
Figure 8D:
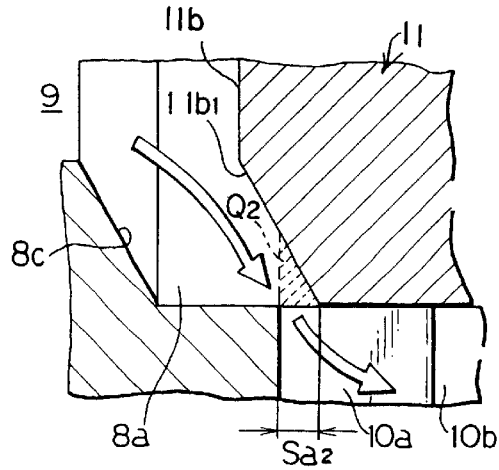
FIG. 8D is a magnified view illustrating how the discharge has further proceeded.

Let S be the length of the small aperture portions 10a. Due to the oblique surface 11b$_1$ in the valve head 11b of the relief valve 11, pressurized fluid is gradually discharged through the small aperture portions 10a, and as the aperture area defined by the small aperture portions 10a and the valve head 11b, and the discharge volume defined by the oblique surface 11b$_1$ change gradually, abrupt changes of the discharge amount during relief can be prevented. FIG. 8A and FIG. 8B show the situation when the relief valve 11 has moved slightly, and FIG. 8C and FIG. 8D show magnifications of the region I. When the relief valve 11 moves and an aperture of the initial aperture area Sa$_1$ is formed at the small aperture portion 10a, then the volume Q$_1$ is defined by the aperture area Sa$_1$ and the oblique surface 11b$_1$, and when the relief valve 11 moves further and an aperture of the aperture area Sa$_2$ is formed at the small aperture portion 10a, and the volume Q$_2$ is defined by the aperture area Sa$_2$ and the oblique surface 11b$_1$, then there is a gradual change from the volume Q$_1$ to the volume Q$_2$.

Thus, it is possible to prevent an abrupt inflow due to the area change of the pressurized fluid toward the large aperture portions 10b while suppressing an abrupt discharge of the pressurized fluid with the aperture portions 10a. Moreover, by reducing the form changes from the small aperture portions 10a to the large aperture portions 10b, it is possible to gradually increase the discharge of the pressurized fluid during relief operation, to minimize pressure fluctuations, and to prevent pressure pulsations.

Figure 9A:
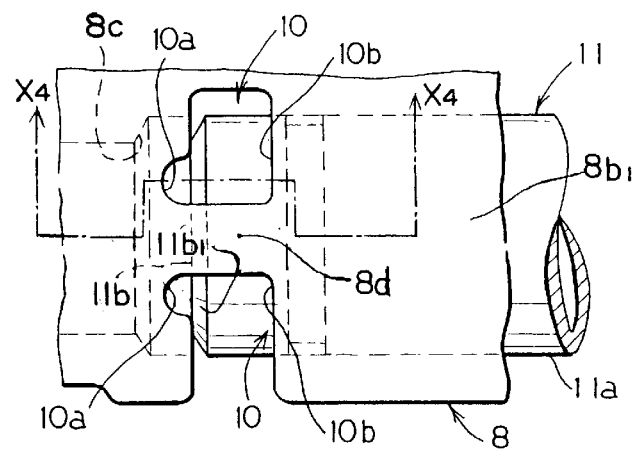
FIG. 9A is a magnified plan view of the discharge operation in the large aperture portions.
Figure 9B:
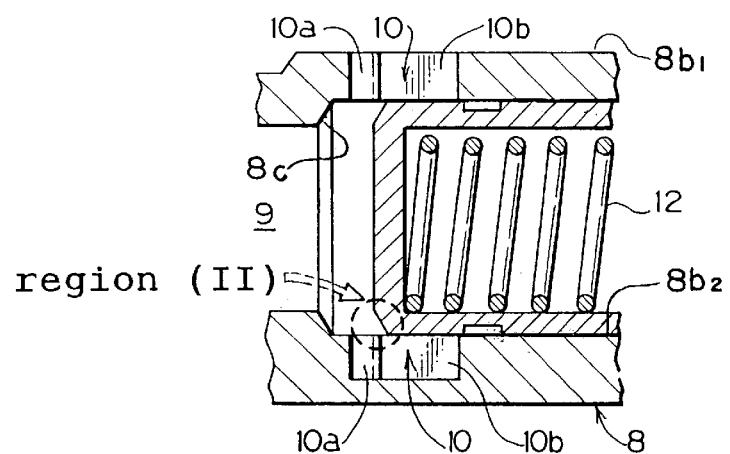
FIG. 9B is a cross-sectional view taken in arrow direction along $X_4$—$X_4$ in FIG. 9A.
Figure 9C:
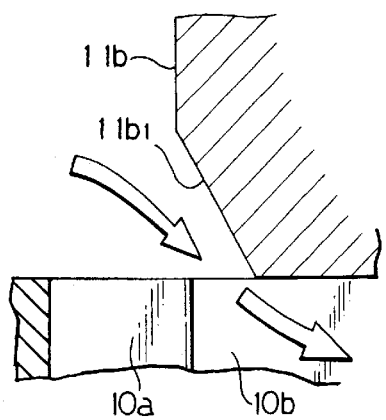
FIG. 9C is a magnified view illustrating the discharge at the region (II) of FIG. 9B.
Figure 11A:
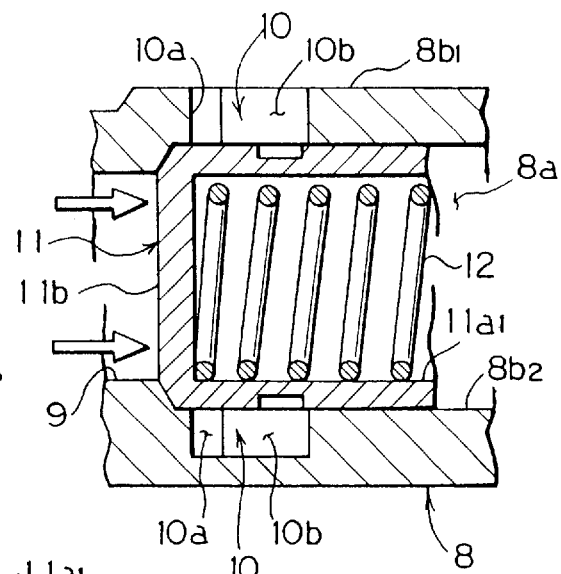
FIG. 11A is a longitudinal cross-sectional lateral view illustrating how relief pressure acts on the relief valve in a first embodiment of the present invention, in which the large aperture portions at the top portion and the bottom portion are provided with small aperture portions.
Figure 11B:
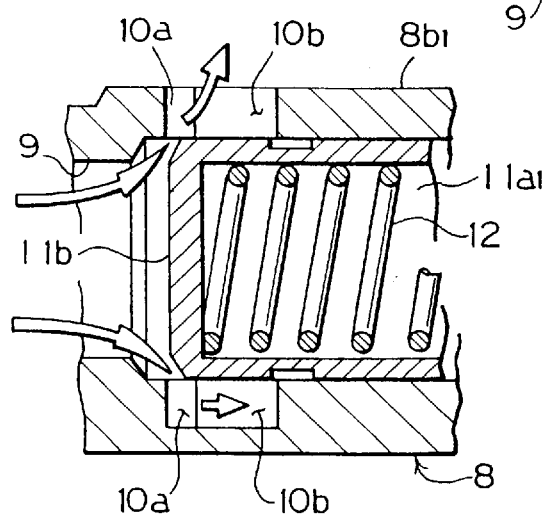
FIG. 11B is a longitudinal cross-sectional lateral view illustrating how the relief valve is subject to relief pressure and shifts while fluid is discharged evenly from the small aperture portions provided at four locations.
Figure 11C:
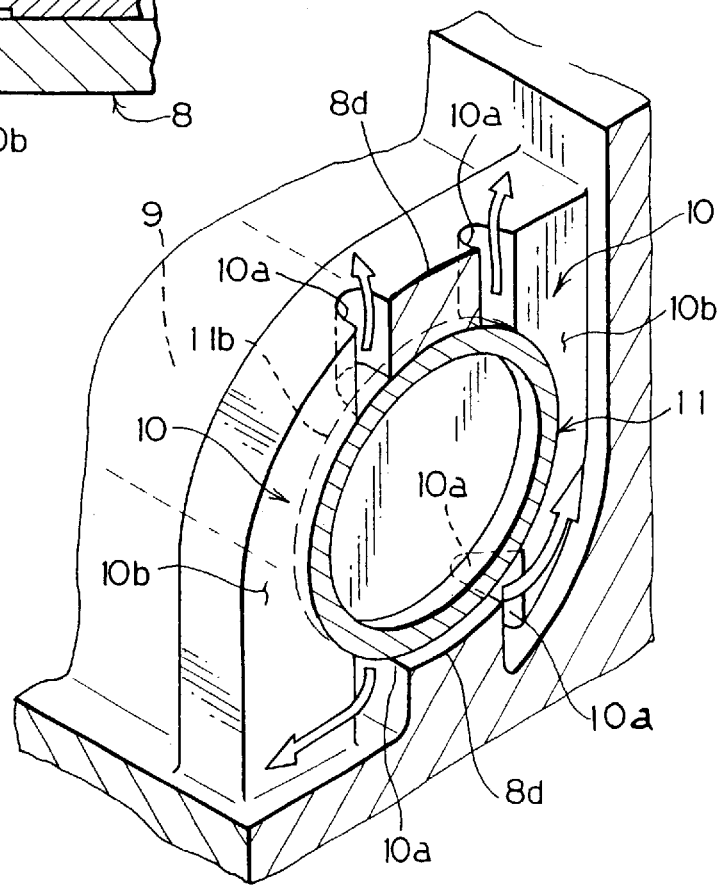
FIG. 11C is a magnified cross-sectional perspective view illustrating how the relief valve is subject to relief pressure while pressurized fluid is discharged evenly from the small aperture portions provided at four locations.
Figure 18:
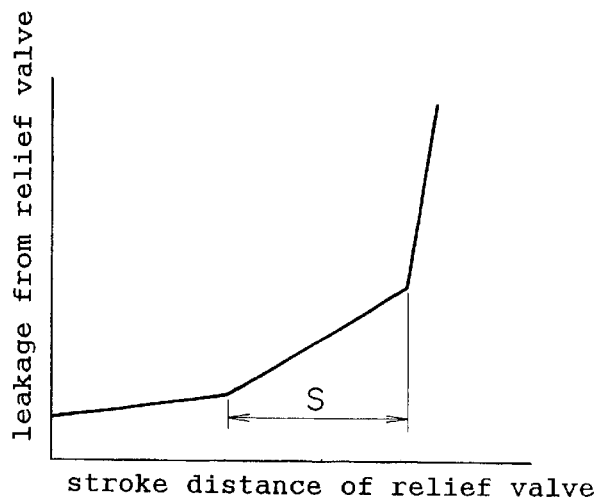
FIG. 18 is a graph illustrating the relief operation of the present invention and a conventional relief operation.

FIG. 9A and FIG. 12B illustrate the situation when the relief valve 11 has reached the large aperture portions 10b. FIG. 9 shows a magnification of the region (II) in FIG. 9B. FIG. 18 is a graph illustrating the relief operation of the present invention. That is to say, the formation of the small aperture portions 10a makes the abrupt change at the length S of the small aperture portions 10a smoother. FIG. 11 shows the embodiment, in which the small aperture portions 10a are formed at the large aperture portions 10b at the top portion 8b$_1$ and the bottom portion 8b$_2$ in the valve housing 8, and shows how the pressurized fluid (indicated by the arrows) presses against the valve head 11b of the relief discharge portion 10, pressurized fluid is discharged from the four small aperture portions 10a, and the valve head 11b begins to move slowly from its resting position (see FIG. 11A and FIG. 11B). FIG. 11C shows how the pressurized fluid is discharged from the four small aperture portions 10a, equalizing the pressure balance with respect to the relief valve 11.

The invention according to claim 1 comprises a relief valve 11, a valve housing 8 including a valve path 8a along which the relief valve 11 can slide, a relief inflow portion 9 formed on one end of the valve housing 8, relief discharge portions 10 formed at a substantially intermediate location of the valve path 8a of the valve housing 8 and provided with small aperture portions 10a and large aperture portions 10b forced in communication with one another. The side where the relief discharge portions 10 are provided with the small aperture portions 10a is the side near the relief inflow portion 9, so that pulsations and noise from the oil path (oil pump, oil filter, etc). due to pressure pulsations can be reduced. Moreover, forming aperture portions on the side of the housing has the advantage that it is possible to reduce the loss of rigidity of the relief valve unit.

When the relief valve 11 slides along the valve path 8a during relief operation, it is supported by the valve path 8a, so that tilting in axial direction can be suppressed, and the relief valve 11 can be prevented from eroding the valve path 8a. Moreover, the sliding of the relief valve 11 is stabilized, so that chattering can be prevented and the start-up properties become smoother.

When die-casting the valve housing 8, the step of forming the relief discharge portions 10 can be simplified, so that there is also the advantage of reduced machining costs.

According to the invention of claim 2, in a relief valve assembly as in claim 1, the large aperture portions 10b of the relief discharge portion 10 are provided at both sides in the width direction of the valve housing 8, both of the large aperture portions facing away from a top portion 8b$_1$ towards a bottom portion 8b$_2$ thereof, and the small aperture portions 10a are respectively provided at a top portion 8b$_1$ and a bottom portion 8b$_2$ of the valve housing 8 of the two large aperture portions 10b, so that the initial operation of the relief valve 11 due to the relieved press are can be stabilized, and tilting in axial direction of the relief valve 11 can be minimized. Explaining these effects in more detail, large aperture portions 10b are forced substantially symmetrically to the left and right at both sides in the width direction of the valve housing 8, extending from an upper portion toward a bottom portions and the large aperture portions 10b are provided with small aperture portions 10a on the upper portion and the bottom portion.

Thus, relief pressure acts on the relief valve 11 at the four small aperture portions 10a formed in the upper portion and the bottom portion of the two large aperture portions 10b, which is a very balanced pressure situation, and because of the even relief pressure at the four small aperture portions 10a, the relief valve 11 is not biased into any direction at the initial movement, the pressing of the relief valve 11 against the inner surface of the valve path 8a and the resulting erosion can be suppressed to a minimum and a smooth operation can be ensured.

According to the invention of claim 3, in a relief valve assembly as in claim 1 or 2, the small aperture portions 10a are formed as indentations in the large aperture portions 10b, which makes the shape of the relief discharge portion 10 extremely simple.

According to the invention of claim 4, in a relief valve assembly as in any of claim 1, 2 or 3, the small aperture portions 10a are shaped to be substantially arcuate, which makes the forming of the relief discharge portions 10 very simple. Moreover, loss of rigidity can be decreased, and in case of metal die-casting, the permanency of the metal die can be improved.

According to the invention of claim 5 in a relief valve assembly as in claim 1 or 2, the small aperture portions 10a and the large aperture portions 10b of the relief discharge portions 10 gradually widen in a substantially continuous shape starting on the side of the relief inflow portion 9, which makes it possible to reduce changes in the shape during the movement from the small aperture portions 10a to the large aperture portions 10b, and to gradually increase the amount of pressurized fluid discharged.

What is claimed is:

1. A relief valve assembly, comprising:

a valve housing defining a valve path therein;

a relief valve slidable along the valve path;

a relief inflow portion formed at one end of the valve housing; and relief discharge apertures formed in an intermediate region on a wall of said valve housing, each of said relief discharge aperture comprising at least one small aperture section and a large aperture section in communication with one another;

wherein said large aperture section is in a substantially rectangular shape as seen in a radial direction perpendicular to the valve path; and said at least one small aperture section is formed on a side of the rectangular shape that faces said relief inflow portion.

2. The relief valve assembly according to claim 1, wherein said at least one small aperture section is formed as a recess extending from said side of the associated large aperture section towards said relief inflow portion.

3. The relief valve assembly according to claim 1, wherein said at least one small aperture section is shaped to be substantially arcuate.

4. The relief valve assembly according to claim 1, wherein said at least one small aperture section is formed contiguous with another side of the associated large aperture section which extends along a portion of said wall remaining between the large aperture sections of two adjacent said relief discharge apertures.

5. The relief valve assembly according to claim 1, wherein said at least one small aperture section is formed with a spacing from another side of the associated large aperture section which extends along a portion of said wall remaining between the large aperture sections of two adjacent said relief discharge apertures.

6. The relief valve assembly according to claim 1, wherein said large aperture section extends circumferentially of said valve housing for a length substantially longer than a portion of said wall remaining between the large aperture sections of two adjacent said relief discharge apertures.

7. The relief valve assembly according to claim 1, wherein the small aperture sections of said relief discharge apertures extend, along the valve path, from said sides of the associated large aperture sections towards said relief inflow portion for different lengths.

8. A relief valve assembly, comprising:

a valve housing defining a valve path therein;

a relief valve slidable along the valve path;

a relief inflow portion formed at one end of the valve housing; and relief discharge apertures formed in an intermediate region on a wall of said valve housing, each of said relief discharge aperture comprising at least a small aperture section and a large aperture section in communication with one another;

wherein said large aperture section is an elongated slot having a substantially uniform width, as measured in a direction of the valve path, and extending circumferentially of said valve housing in a plane substantially perpendicularly to the valve path;

said at least one small aperture section is formed on a side of the elongated slot that faces said relief inflow portion; and at least one of said relief discharge apertures comprises two distinct said small aperture sections formed adjacent to two longitudinally opposite ends of the associated large aperture section.

9. The relief valve assembly according to claim 8, wherein said at least one small aperture section is formed as a recess extending from said side of the associated large aperture section towards said relief inflow portion.

10. The relief valve assembly according to claim 8, wherein said at least one small aperture section is shaped to be substantially arcuate.

11. The relief valve assembly according to claim 8, wherein said at least one small aperture section is formed contiguous with another side of the associated large aperture section which extends along a portion of said wall remaining between the large aperture sections of two adjacent said relief discharge apertures.

12. The relief valve assembly according to claim 8, wherein said at least one small aperture section is formed with a spacing from another side of the associated large aperture section which extends along a portion of said wall remaining between the large aperture sections of two adjacent said relief discharge apertures.

13. The relief valve assembly according to claim 8, wherein said large aperture section extends circumferentially of said valve housing for a length substantially longer than a portion of said wall remaining between the large aperture sections of two adjacent said relief discharge apertures.

14. The relief valve assembly according to claim 8, wherein the small aperture sections of said relief discharge apertures extend, along the valve path, from said sides of the associated large aperture sections towards said relief inflow portion for different lengths.

15. A relief valve assembly, comprising:

a valve housing defining a valve path therein;

a relief valve slidable along the valve path;

a relief inflow portion formed at one end of the valve housing; and relief discharge apertures formed in an intermediate region on a wall of said valve housing, each of said relief discharge aperture comprising at least one small aperture section and a large aperture section in communication with one another;

wherein a length of said relief discharge aperture, as measured circumferentially of said housing in a plane substantially perpendicular to the valve path, changes abruptly at a separation line between said small and large aperture sections.

16. The relief valve assembly according to claim 15, wherein said small aperture section extends along the separation line for a length substantially shorter than the associated large aperture section.

17. The relief valve assembly according to claim 15, wherein said relief discharge apertures comprise two relief discharge apertures the large aperture sections of which extend circumferentially from a top portion to a bottom portion of said valve housing;

respective circumferentially opposite ends of said two large aperture sections in the top and bottom portions of said housing are separated by two distinct remaining portions of said wall; and each of said two large aperture sections extends circumferentially of said valve housing for a length substantially longer than each of said two remaining walls.

* * * * *